United States Patent
Doi et al.

(10) Patent No.: US 12,107,450 B2
(45) Date of Patent: Oct. 1, 2024

(54) POWER SUPPLY UNIT AND VEHICLE

(71) Applicant: TOYOTA JIDOSHA KABUSHIKI KAISHA, Aichi-ken (JP)

(72) Inventors: Taiga Doi, Okazaki (JP); Kenji Murasato, Toyota (JP); Daisuke Kamikihara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1 day.

(21) Appl. No.: 17/841,667

(22) Filed: Jun. 16, 2022

(65) Prior Publication Data

US 2022/0407328 A1 Dec. 22, 2022

(30) Foreign Application Priority Data

Jun. 18, 2021 (JP) ................................. 2021-101467

(51) Int. Cl.
*H02J 7/00* (2006.01)
*B60R 16/033* (2006.01)

(52) U.S. Cl.
CPC .......... *H02J 7/0068* (2013.01); *B60R 16/033* (2013.01); *H02J 2207/20* (2020.01)

(58) Field of Classification Search
CPC ........ H02J 7/0068; H02J 2207/20; H02J 7/02; H02J 2207/40; H02J 2310/48; B60R 16/033; B60L 2210/12; B60L 2210/30; B60L 15/007; B60L 53/22; B60L 1/00; Y02T 10/70; Y02T 10/7072

See application file for complete search history.

(56) References Cited

U.S. PATENT DOCUMENTS

| | | | |
|---|---|---|---|
| 10,205,316 B1 | 2/2019 | Jojima et al. | |
| 11,070,073 B2* | 7/2021 | Tiedtke | H02J 7/0068 |
| 2006/0030176 A1* | 2/2006 | Ikeda | H02G 3/088 |
| | | | 439/76.2 |
| 2010/0038156 A1* | 2/2010 | Fujitake | B60L 53/22 |
| | | | 180/65.21 |
| 2012/0068663 A1* | 3/2012 | Tanikawa | B60L 53/14 |
| | | | 320/109 |
| 2013/0069599 A1* | 3/2013 | Kimura | B60L 53/62 |
| | | | 320/162 |
| 2015/0015188 A1* | 1/2015 | Ono | H02J 3/322 |
| | | | 320/107 |

(Continued)

FOREIGN PATENT DOCUMENTS

| | | | | |
|---|---|---|---|---|
| EP | 2983260 A1 | 2/2016 | | |
| JP | 2004127747 A | * | 4/2004 | ............... B60K 1/02 |

(Continued)

*Primary Examiner* — Daniel Kessie
*Assistant Examiner* — Terrence R Willoughby
(74) *Attorney, Agent, or Firm* — HAUPTMAN HAM, LLP

(57) ABSTRACT

A power supply unit includes a current path, and is capable of receiving external power from an external power supply and supplying the received external power to a power storage device, and receiving power from the power storage device and supplying the received power to a device mounted in a vehicle. The power supply unit comprises one or more power converters, a relay that switches the current path, and a housing that accommodates the one or more power converters and the relay therein. The one or more power converters are heavier in weight than the relay and disposed in the housing below the relay.

6 Claims, 6 Drawing Sheets

(56) References Cited

U.S. PATENT DOCUMENTS

| | | | |
|---|---|---|---|
| 2015/0043132 A1 | 2/2015 | Miyashita et al. | |
| 2016/0207403 A1* | 7/2016 | Iida | H02M 3/04 |
| 2020/0207200 A1 | 7/2020 | Yamanaka et al. | |

FOREIGN PATENT DOCUMENTS

| | | |
|---|---|---|
| JP | 2011-006050 A | 1/2011 |
| JP | 2011-20553 A | 2/2011 |
| JP | 2013-209078 A | 10/2013 |
| JP | 2019-68638 A | 4/2019 |
| JP | 2020-107632 A | 7/2020 |
| WO | 2010/133934 A1 | 11/2010 |
| WO | 2019117023 A1 | 6/2019 |

* cited by examiner

POWER SUPPLY UNIT AND VEHICLE

This nonprovisional application is based on Japanese Patent Application No. 2021-101467 filed on Jun. 18, 2021 with the Japan Patent Office, the entire contents of which are hereby incorporated by reference.

BACKGROUND

Field

The present disclosure relates to a power supply unit and a vehicle comprising the power supply unit.

Description of the Background Art

Conventionally, Japanese Patent Laying-Open No. 2011-020553 discloses a power apparatus mounted in a vehicle and including a charger that receives low-voltage power through a low-voltage port and converts the received low-voltage power into high voltage and a circuit box having a plurality of relays and a DC/DC converter incorporated therein. The charger is located at a rear portion of the vehicle and the circuit box is located at a front portion of the vehicle.

SUMMARY

The power apparatus disclosed in Japanese Patent Laying-Open No. 2011-020553, however, has the charger and the circuit box disposed at the rear portion and front portion, respectively, of the vehicle with a considerable distance therebetween, and thus has its constituent parts mounted inefficiently.

In order to mount parts more efficiently, a plurality of power converters such as a charger and a DC/DC converter may be disposed close to one another. On the other hand, a power conversion device is relatively heavy in weight, and when the power conversion device is disposed without any consideration, a large moment is input by vibration, which may decrease durability or affect the vehicle's behavior.

The present disclosure has been made in view of the above problem, and an object of the present disclosure is to provide a power supply unit and vehicle capable of reducing a moment that acts through vibration while increasing efficiency of mounting parts in the vehicle.

A power supply unit according to the present disclosure includes a current path, and is capable of receiving external power from an external power supply and supplying the received external power to a power storage device, and receiving power from the power storage device and supplying the received power to a device mounted in a vehicle. The power supply unit comprises one or more power converters, a relay that switches the current path, and a housing that accommodates the one or more power converters and the relay therein. The one or more power converters are heavier in weight than the relay and are disposed in the housing below the relay.

According to the above configuration, the one or more power converters and the relay are accommodated in the housing of the power supply unit and thus disposed close to one another, and can thus be mounted in the vehicle more efficiently. Further, disposing the one or more heavy power converters below the lightweight relay allows the power supply unit to have a center of gravity at a low level. This can reduce a moment acting on the power supply unit through vibration.

In the power supply unit according to the present disclosure, preferably, the relay is provided on the current path between an inlet to which the external power supply is connected and the power storage device, and switches a state in which the inlet and the power storage device are electrically connected to each other to a state in which the inlet and the power storage device are electrically disconnected from each other, and vice versa.

According to the above configuration, the relay provided on the current path between the inlet to which the external power supply is connected and the power storage device and the one or more power converters can be disposed in the housing such that the relay and the one or more power converters are close to one another.

The power supply unit according to the present disclosure may further comprise a control device that is accommodated in the housing and controls an operation of the relay and that of the one or more power converters. In this case, it is preferable that the control device be lighter in weight than the one or more power converters and disposed in the housing above the one or more power converters.

According to the above configuration, the control device is further accommodated in the housing, and efficiency of mounting in the vehicle can be improved. Further, disposing the one or more heavy power converters at a lower level and the lightweight control device at an upper level allows the power supply unit to have a center of gravity at a low level. This can reduce a moment acting on the power supply unit through vibration.

In the power supply unit according to the present disclosure, the one or more power converters may include a plurality of power converters. In this case, it is preferable that the heaviest one of the plurality of power converters be disposed in the housing at the same level as the other power converters or a level lower than the other power converters.

According to the above configuration, by accommodating the plurality of power converters in the housing, efficiency of mounting in the vehicle can be further improved. Further, disposing the heaviest one of the plurality of power converters in the housing at the same level as the other power converters or a level lower than the other power converters allows the power supply unit to have a center of gravity at a low level. This can reduce a moment acting on the power supply unit through vibration.

In the power supply unit according to the present disclosure, the one or more power converters may include a first power converter that receives AC power from an AC power supply external to the vehicle and converts the received AC power into power chargeable to the power storage device, and a second power converter that receives power from the power storage device and converts the received power into power supplied to an auxiliary device mounted in the vehicle. In this case, it is preferable that the first power converter be heavier in weight than the second power converter and disposed in the housing below the second power converter.

According to the above configuration, by accommodating the first power converter and the second power converter in the housing, efficiency of mounting in the vehicle can be improved. Further, disposing the first power converter that is heavier in weight than the second power converter below the second power converter allows the power supply unit to have a center of gravity at a low level. This can reduce a moment acting on the power supply unit through vibration.

In the power supply unit according to the present disclosure, the one or more power converters may further include a third power converter that converts an output of the first power converter into power supplied to the auxiliary device mounted in the vehicle. In this case, it is preferable that the first power converter be heavier in weight than the second power converter and the third power converter, and disposed in the housing below the second power converter and the third power converter.

According to the above configuration, by accommodating the first power converter, the second power converter and the third power converter in the housing, efficiency of mounting in the vehicle can be improved. Further, disposing the first power converter that is heavier in weight than the second power converter and the third power converter below the second power converter and the third power converter allows the power supply unit to have a center of gravity at a low level. This can reduce a moment acting on the power supply unit through vibration.

A vehicle according to a first aspect of the present disclosure comprises the power supply unit and the auxiliary device. In this case, the second power converter and the third power converter may be connected to the auxiliary device.

According to the above configuration, the vehicle provided with the auxiliary device can achieve improved mounting efficiency and reduce a moment acting on the power supply unit through vibration.

A vehicle according to a second aspect of the present disclosure comprises the power supply unit and a transaxle. The power supply unit is disposed above the transaxle.

The transaxle is susceptible to vibration, and according to the above configuration, the power supply unit is disposed above the transaxle, and a moment acting on the power supply unit through vibration can be effectively reduced.

A vehicle according to a third aspect of the present disclosure comprises the power supply unit, the power storage device, and a floor panel that allows the power storage device to be mounted. The power storage device is disposed below the floor panel at a location on the vehicle rearwardly of the power supply unit.

According to the above configuration, a balance in weight longitudinally of the vehicle can be stabilized.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be described in detail with reference to the drawings. In the following embodiment, any identical or common component is identically denoted and will not be described redundantly.

First Embodiment

Figure 1:
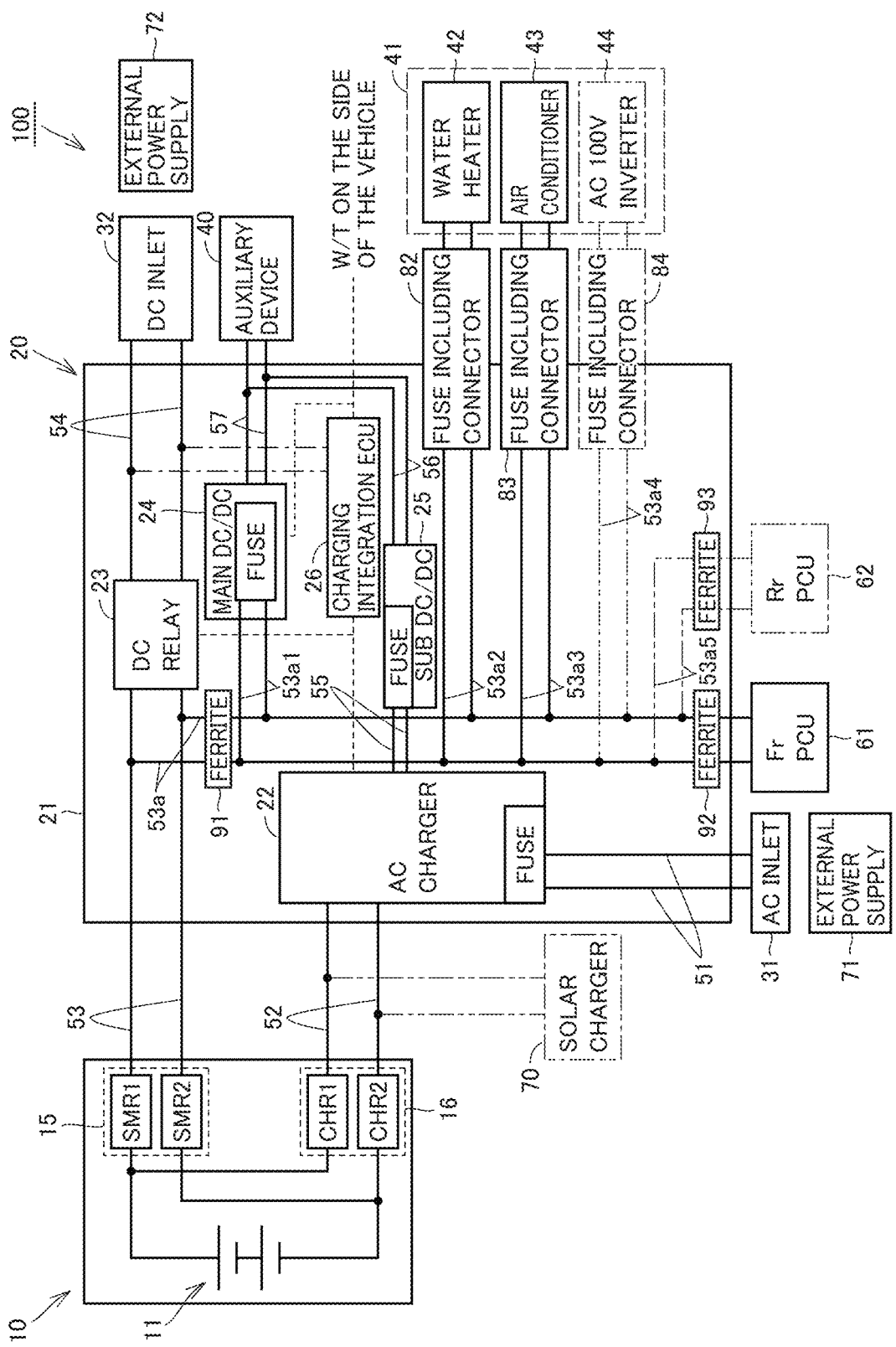
FIG. 1 is a diagram of a configuration of a power apparatus according to a first embodiment.

FIG. 1 is a diagram of a configuration of a power apparatus according to a first embodiment. A power apparatus 100 according to the first embodiment will be described with reference to FIG. 1.

Figure 3:
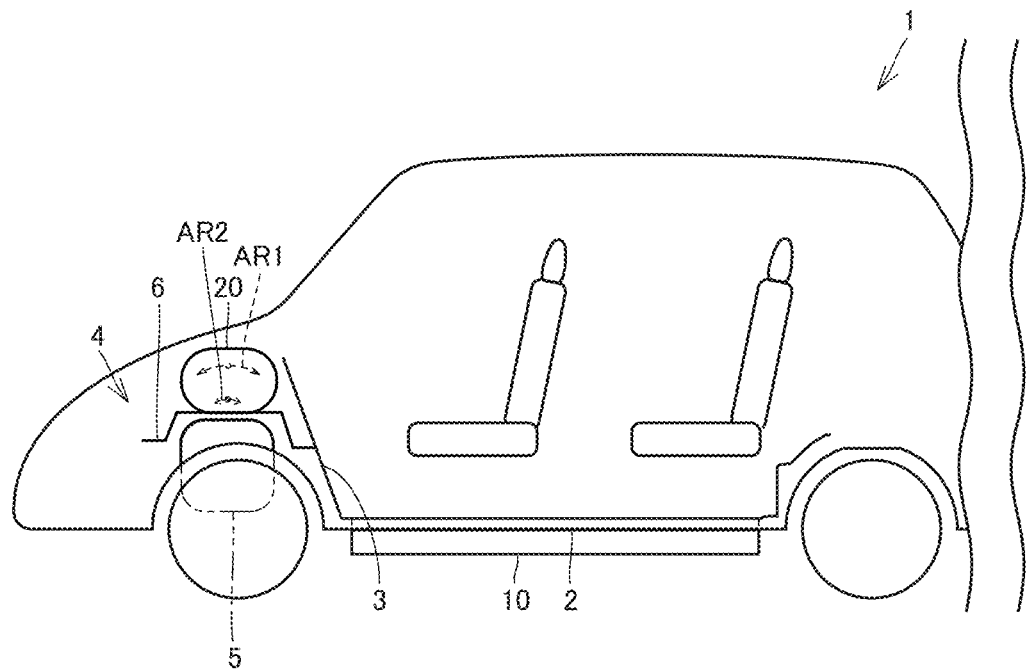
FIG. 3 is a schematic diagram showing a position of the power supply unit mounted in a vehicle according to the first embodiment.

Power apparatus 100 is mounted in a vehicle 1 (see FIG. 3). Vehicle 1 is a hybrid electric vehicle that can travel using power of at least one of a motor and an engine, or an electrically powered vehicle that travels using a driving force obtained through electric energy.

As shown in FIG. 1, power apparatus 100 includes a power storage device 10, a power supply unit 20, an AC (alternating current) inlet 31 as a first inlet, a DC (direct current) inlet 32 as a second inlet, a low voltage auxiliary device 40, a high voltage auxiliary device 41, a front power control unit (Fr_PCU) 61, a rear power control unit Rr_PCU) 62, and a solar charger 70.

Power storage device 10 is mounted in vehicle 1 as a driving power source for vehicle 1. Power storage device 10 includes a battery pack 11, a system main relay (SMR1, SMR2) 15, and a charging relay 16 (CHR1, CHR2).

Battery pack 11 is composed of a plurality of unit cells stacked in layers. The unit cell is, for example, a secondary battery such as a nickel metal hydride battery or a lithium-ion battery. A unit cell C1 may use a liquid electrolyte or a solid electrolyte. A capacitor may be used instead of the unit cell.

Power storage device 10 is connected to a DC relay 23, which will be described hereinafter, by a power line 53. Power line 53 is branched into a power line 53a, and power line 53a is connected to front power control unit 61. Ferrite cores 91 and 92 as a noise countermeasure member are attached to power line 53a. Similarly, a ferrite core 93 as a noise countermeasure member is also attached to a power line 53a5, which will be described hereinafter.

Power storage device 10 is connected to an AC charger 22 that serves as a first power converter by a power line 52. Solar charger 70 may be connected to power line 52.

System main relay 15 is provided on power line 53 between battery pack 11 and DC relay 23. System main relay 15 is switched on/off by a charging integration ECU 26 serving as an electronic control unit, which will be described hereinafter.

Charging relay 16 is provided on power line 52 between battery pack 11 and AC charger 22. Charging relay 16 is switched on/off by charging integration ECU 26.

Power supply unit 20 includes a current path, a housing 21, AC charger 22, DC relay 23, a main DC/DC converter 24 as a second power converter, a sub DC/DC converter 25 as a third power converter, charging integration ECU 26, and connectors 82, 83 and 84.

The current path is composed of a portion of power lines 52, 53, and 53a described above and power lines 51, 53a1, 53a2, 53a3, 53a4, 54, 55, 56, 57 described hereinafter, that is routed in housing 21.

Charging integration ECU 26 controls operation of AC charger 22, DC relay 23, main DC/DC converter 24, and sub DC/DC converter 25. Charging integration ECU 26 is connected to an ECU of a higher level (not shown) and can communicate with the ECU. Charging integration ECU 26 can sense the temperature of power line 54.

AC charger 22, DC relay 23, main DC/DC converter 24, sub DC/DC converter 25, and charging integration ECU 26 are disposed inside housing 21. Connectors 82, 83, and 84 are provided on a side surface of the housing. Connectors 82, 83, and 84 have a fuse. The fuse is configured to interrupt a current path when a current exceeding the fuse's rated current passes through the fuse.

AC charger 22 is connected to battery pack 11 by power line 52, as described above. AC charger 22 is also connected to AC inlet 31 by power line 51.

AC inlet 31 allows a first external power supply 71, which is an AC power supply, to be connected thereto. AC charger 22 receives AC power from first external power supply 71 via power line 51 and converts the received AC power into DC power chargeable to power storage device 10.

When charging relay 16 is in the ON state, battery pack 11 is charged with power converted by AC charger 22 into DC power. When solar charger 70 is provided as described above, battery pack 11 may also be charged with power received from solar charger 70.

AC charger 22 has a fuse, and the fuse is configured to interrupt a current path when a current exceeding the fuse's rated current passes through the fuse.

DC relay 23 is connected to battery pack 11 by power line 53, as described above. DC relay 23 is also connected to DC inlet 32 by power line 54. That is, DC relay 23 is provided on a current path between DC inlet 32 and power storage device 10. DC inlet 32 allows a second external power supply 72, which is a DC power supply, to be connected thereto.

DC relay 23 is connected to charging integration ECU 26 and switched on/off by charging integration ECU 26. That is, DC relay 23 switches a state in which DC inlet 32 and power storage device 10 are electrically connected to each other to a state in which DC inlet 32 and power storage device 10 are electrically disconnected from each other, and vice versa.

When DC relay 23 and system main relay 15 are in the ON state. DC power supplied from the second external power supply via power line 54 is charged to battery pack 11 through power line 53. In this case, battery pack 11 can be charged rapidly.

Main DC/DC converter 24 is connected via power line 53$a$1 to power line 53$a$ aforementioned. Main DC/DC converter 24 is connected to low-voltage auxiliary device 40 via power line 57.

Main DC/DC converter 24 receives power from power storage device 10 and converts the received power into power to be supplied to an auxiliary device mounted in the vehicle. Specifically, main DC/DC converter 24 receives power from battery pack 11, decreases the received power in voltage, and supplies low-voltage auxiliary device 40 with the power decreased in voltage, Low-voltage auxiliary device 40 is, for example, an illumination device, an audio device, a power steering device, or the like. As well as AC charger 22, main DC/DC converter 24 also has a fuse.

Sub DC/DC converter 25 is connected to AC charger 22 by power line 55, Sub DC/DC converter 25 is connected to low-voltage auxiliary device 40 by power line 56. Sub DC/DC converter 25 has a power capacity smaller than that of main DC/DC converter 24.

Sub DC/DC converter 25 converts an output of AC charger 22 into power to be supplied to the auxiliary device mounted in the vehicle, Specifically, sub DC/DC converter 25 receives power converted by AC charger 22 into a DC current, decreases the received power in voltage, and supplies low-voltage auxiliary device 40 with the power decreased in voltage. As well as AC charger 22, sub DC/DC converter 25 also has a fuse.

Connector 82 is connected to battery pack 11 by power lines 53, 53$a$, and 53$a$2. Connector 83 is connected to battery pack 11 by power lines 53, 53$a$, and 53$a$3. Connector 84 is connected to battery pack 11 by power lines 53, 53$a$, and 53$a$4.

Connectors 82, 83, and 84 are connected to high-voltage auxiliary device 41 by external wiring. High-voltage auxiliary device 41 includes a water heater 42, an air conditioner 43, and an AC 100V inverter 44.

Water heater 42 is connected to connector 82. Water heater 42 is a heater that heats an interior of a compartment of the vehicle. Water heater 42 has a pipe, for example, and indirectly heats air by heating water circulating through the pipe.

Air conditioner 43 is connected to connector 83, Air conditioner 43 includes a compressor and operates the compressor in response to a control signal received from an ECU to perform air conditioning of the compartment of the vehicle.

As a fourth power converter, AC 100V inverter 44 is connected to connector 84. AC 100V inverter 44 is mounted in vehicle 1 as a spare device for main DC/DC converter 24. AC 100V inverter 44 is, for example, an in-vehicle receptacle. AC 100V inverter 44 may be dispensed with.

When vehicle 1 has both front and rear wheels as driving wheels, front power control unit 61 and rear power control unit 62 are provided as described above. Front power control unit 61 is connected to battery pack 11 by power lines 53 and 53$a$. Rear power control unit 62 is connected to battery pack 11 by power lines 53, 53$a$, and 53$a$5.

Front power control unit 61 and rear power control unit 62 receive power from power storage device 10 to drive a motor generator. Front power control unit 61 and rear power control unit 62 include, for example, an inverter for driving the motor generator, a converter for receiving power output from power storage device 10, increasing the received power in voltage, and supplying the inverter with the power increased in voltage, and the like.

When vehicle 1 has front wheels as driving wheels, rear power control unit 62 may be dispensed with.

Figure 2:
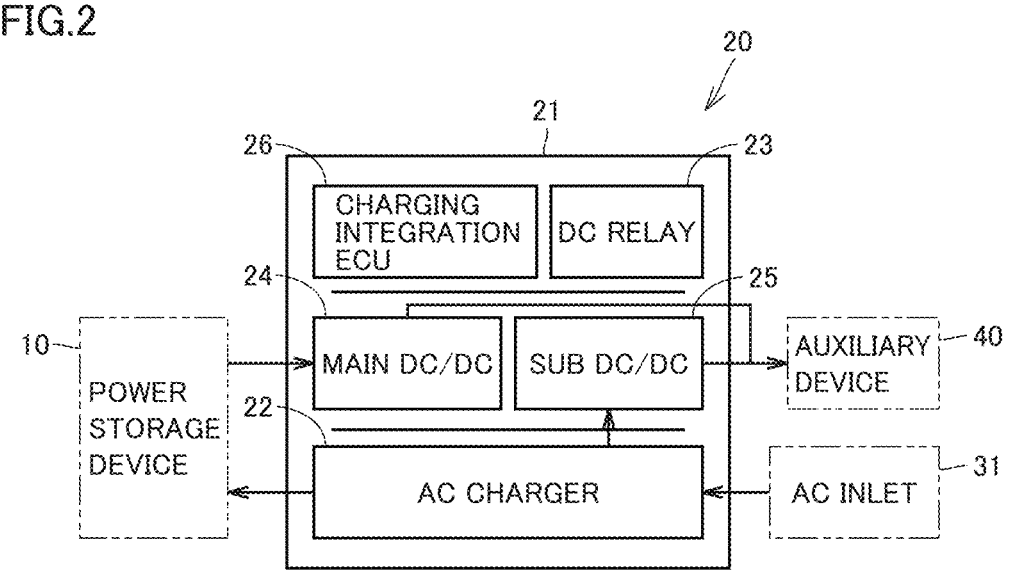
FIG. 2 is a schematic diagram showing a positional relationship between components constituting a power supply unit according to the first embodiment.

FIG. 2 is a schematic diagram showing a positional relationship between components constituting the power supply unit according to the first embodiment. Referring to FIG. 2, the positional relationship between components constituting the power supply unit will be described.

As shown in FIG. 2, charging integration ECU 26 and DC relay 23 are disposed in housing 21 at an upper portion. Charging integration ECU 26 and DC relay 23 are disposed at the same hierarchical level.

Main DC/DC converter 24 and sub DC/DC converter 25 are disposed in housing 21 at a middle portion. Main DC/DC converter 24 and sub DC/DC converter 25 are disposed at the same hierarchical level. AC charger 22 is disposed in housing 21 at a lower portion.

More specifically, charging integration ECU 26 and DC relay 23 are disposed in housing 21 above AC charger 22 and above main DC/DC converter 24 and sub DC/DC converter 25.

Main DC/DC converter 24 and sub DC/DC converter 25 are disposed in housing 21 below charging integration ECU 26 and DC relay 23 and above AC charger 22.

Herein, AC charger 22 is heavier in weight than main DC/DC converter 24 and sub DC/DC converter 25, and heaviest among the power converters of AC charger 22, main DC/DC converter 24, and sub DC/DC converter 25.

Further, charging integration ECU 26 and DC relay 23 are lighter in weight than AC charger 22, and furthermore, lighter in weight than main DC/DC converter 24 and sub DC/DC converter 25.

Therefore, in the first embodiment, disposing charging integration ECU 26, DC relay 23, AC charger 22, main DC/DC converter 24, and sub DC/DC converter 25 in housing 21, as described above, allows power supply unit 20 to have a center of gravity at a low level.

FIG. 3 is a schematic diagram showing a position of the power supply unit mounted in the vehicle according to the first embodiment. The position of power supply unit 20 mounted in vehicle 1 will be described with reference to FIG. 3.

As shown in FIG. 3, vehicle 1 comprises a floor panel 2, a dash panel 3, a transaxle 5, a support member 6, power storage device 10, and power supply unit 20.

Power storage device 10 is disposed under floor panel 2 rearwardly of power supply unit 20. This can stabilize a balance in weight longitudinally of vehicle 1.

Transaxle 5, support member 6, and power supply unit 20 are installed in a front compartment 4 located in front of dash panel 3. Support member 6 may be fixed to dash panel 3, or may be fixed by a member (not shown) to a frame of the vehicle, such as a cross member or a side member.

Power supply unit 20 is disposed above transaxle 5 and supported by support member 6.

When power supply unit 20 is disposed above transaxle 5, power supply unit 20 is easily affected by vibration received from vehicle 1 including vibration of transaxle 5. When disposing AC charger 22, main DC/DC converter 24 and sub DC/DC converter 25 in housing 21 and thus lowering the center of gravity of power supply unit 20 in level, as described above, is compared with having the center of gravity at a high level as indicated in FIG. 3 by a broken line arrow AR1, the former can reduce a moment acting on power supply unit 20 through vibration, as indicated in FIG. 3 by a solid line arrow AR2.

While in the first embodiment an example in which the heaviest power converter of AC charger 22, main DC/DC converter 24, and sub DC/DC converter 25 is disposed below the other power converters has been described, this is not exclusive, and the former may be disposed at the same level as the latter.

Second Embodiment

Figure 4:
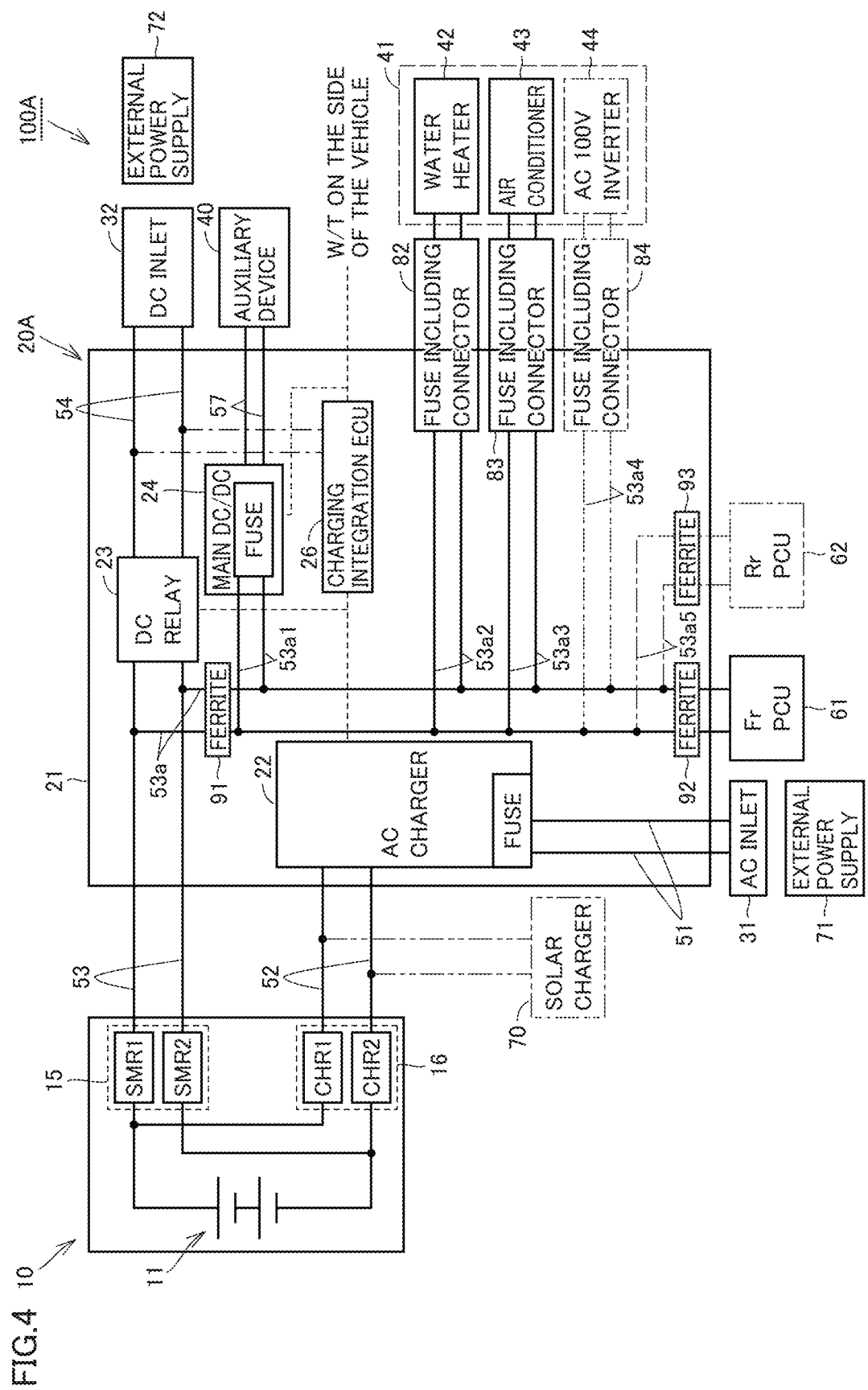
FIG. 4 is a diagram of a configuration of a power apparatus according to a second embodiment.

FIG. 4 is a diagram of a configuration of a power apparatus according to a second embodiment. A power apparatus 100A according to the second embodiment will be described with reference to FIG. 4.

As shown in FIG. 4, power apparatus 100A according to the second embodiment is different from power apparatus 100 according to the first embodiment in that a power supply unit 20A dispenses with sub DC/DC converter 25. The remainder in configuration is substantially identical.

Figure 5:
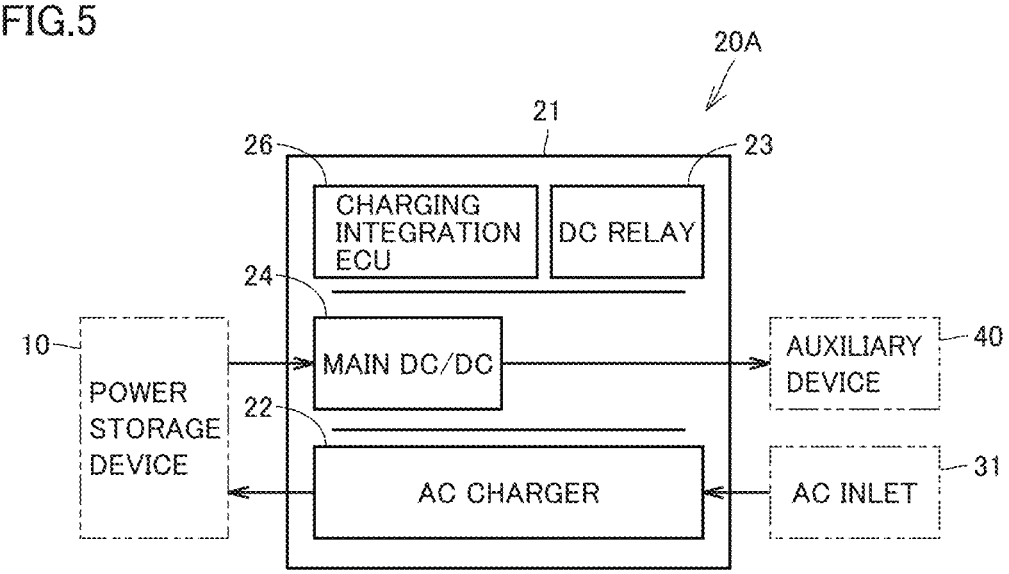
FIG. 5 is a schematic diagram showing a positional relationship between components constituting a power supply unit according to the second embodiment.

FIG. 5 is a schematic diagram showing a positional relationship between components constituting the power supply unit according to the second embodiment. Referring to FIG. 5, the positional relationship between the components constituting power supply unit 20A will be described.

As shown in FIG. 5, power supply unit 20A has charging integration ECU 26 and DC relay 23 disposed in housing 21 above AC charger 22 and above main DC/DC converter 24.

Main DC/DC converter 24 is disposed in housing 21 below charging integration ECU 26 and DC relay 23 and above AC charger 22.

Thus disposing charging integration ECU 26, DC relay 23, AC charger 22, and main DC/DC converter 24 in housing 21 allows power supply unit 20A to have a center of gravity at a low level. Thus, power supply unit 20A according to the second embodiment is substantially as effective as power supply unit 20 according to the first embodiment. Further, as sub DC/DC converter 25 is dispensed with, power supply unit 20A can be lightweight.

Third Embodiment

Figure 6:
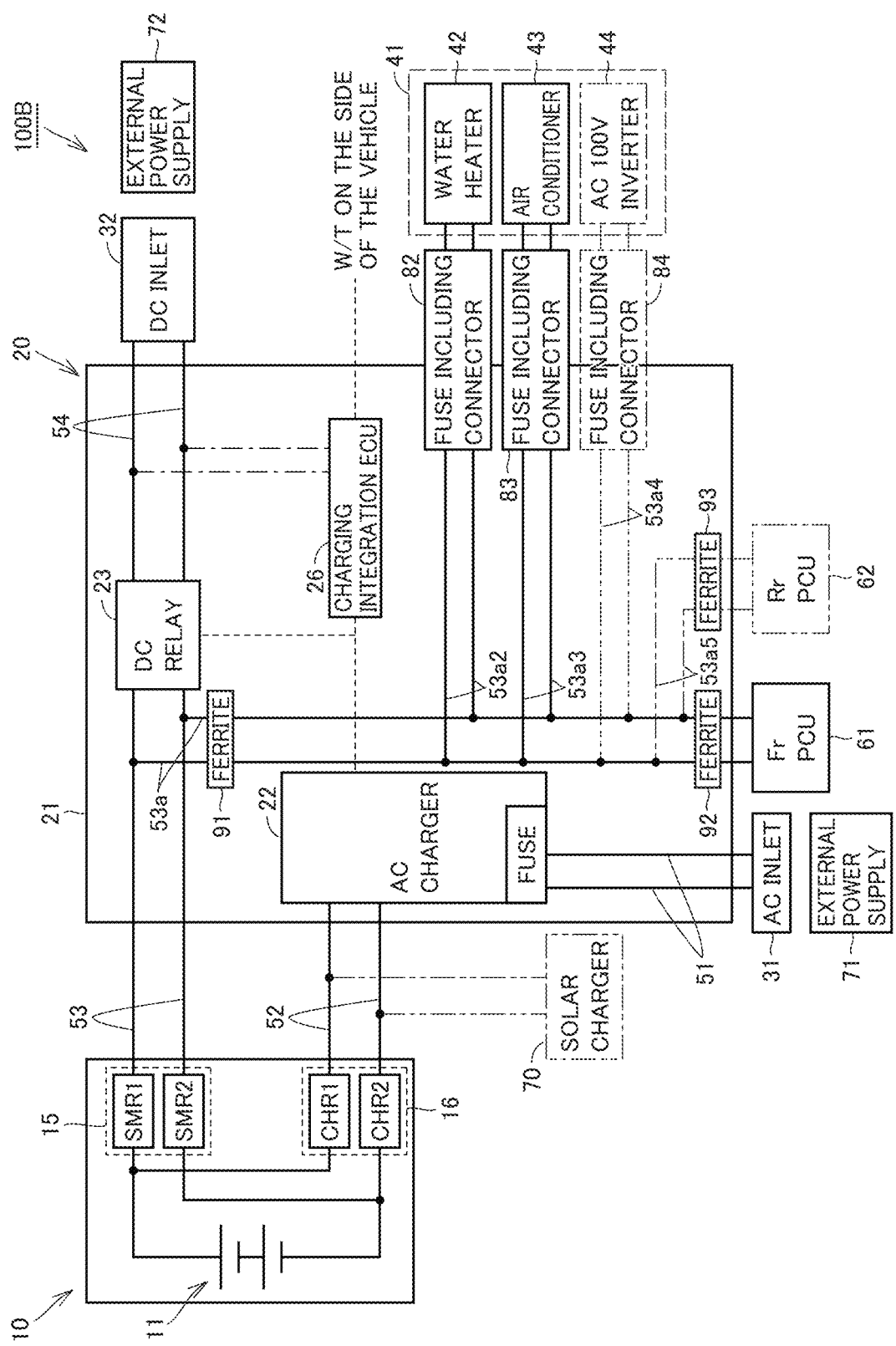
FIG. 6 is a diagram of a configuration of a power apparatus according to a third embodiment.

FIG. 6 is a diagram of a configuration of a power apparatus according to a third embodiment. Referring to FIG. 6, a description will be given of a power apparatus 100B according to the third embodiment.

As shown in FIG. 6, power apparatus 100B according to the third embodiment differs from power apparatus 100 according to the first embodiment in that power supply unit 20B dispenses with main DC/DC converter 24 and sub DC/DC converter 25, The remainder in configuration is substantially identical.

Figure 7:
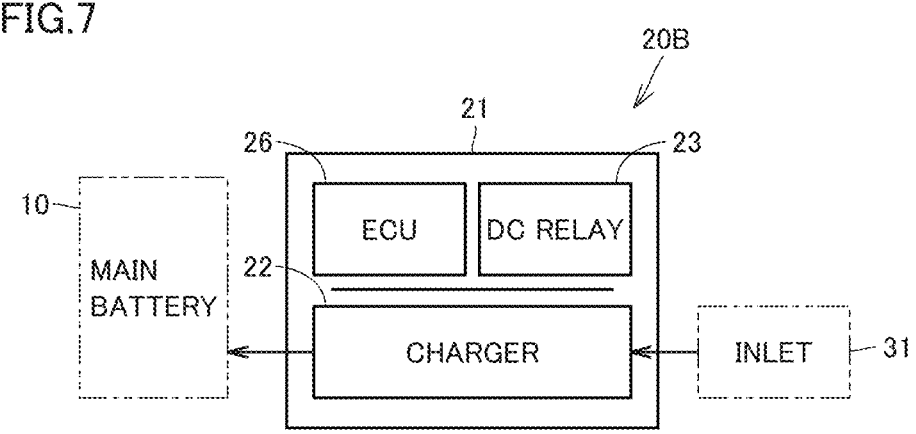
FIG. 7 is a schematic diagram showing a positional relationship between components constituting a power supply unit according to the third embodiment.

FIG. 7 is a schematic diagram showing a positional relationship between components constituting the power supply unit according to the third embodiment. Referring to FIG. 7, the positional relationship between the components constituting power supply unit 20B will be described.

As shown in FIG. 7, power supply unit 20B has charging integration ECU 26 and DC relay 23 disposed in housing 21 above AC charger 22, and power supply unit 20B can thus have a center of gravity at a low level. Thus, power supply unit 20B according to the third embodiment is also substantially as effective as power supply unit 20 according to the first embodiment. Further, as main DC/DC converter 24 and sub DC/DC converter 25 are dispensed with, power supply unit 2011 can be lightweight.

Although the embodiments of the present invention have been described, it should be considered that the embodiments disclosed herein are illustrative and non restrictive in every respect. The scope of the present invention is defined by the terms of the claims, and is intended to include any modifications within the scope and meaning equivalent to the terms of the claims.

What is claimed is:

1. A power supply unit that includes a current path and is capable of receiving external power from an external power supply and supplying the received external power to a power storage device, and receiving power from the power storage device and supplying the received power to a device mounted in a vehicle, the power supply unit comprising:
   one or more power converters;
   a relay that switches the current path;
   a housing that accommodates the one or more power converters and the relay therein,
      the one or more power converters being heavier in weight than the relay and disposed in the housing below the relay; and
   a control device accommodated in the housing and configured to control the relay and the one or more power converters, wherein
   the one or more power converters include
      a first power converter configured to
         receive alternating-current power from an alternating-current power supply external to the vehicle, and convert the received alternating-current power into first power chargeable to the power storage device,
a second power converter configured to
receive the power from the power storage device, and
convert the received power into second power supplied to an auxiliary device mounted in the vehicle, and
a third power converter configured to convert an output of the first power converter into third power supplied to the auxiliary device mounted in the vehicle,
the control device is lighter in weight than each of the first, second, and third power converters and disposed, in the housing, in entirety above the first, second, and third power converters,
the relay is lighter in weight than each of the first, second, and third power converters and disposed, in the housing, in entirety above the first, second, and third power converters, and
the first power converter is heavier in weight than each of the second power converter and the third power converter, and disposed, in the housing, in entirety below the second power converter and the third power converter.

2. The power supply unit according to claim 1, wherein the relay is provided on the current path between an inlet to which the external power supply is connected and the power storage device, and configured to switch between a state in which the inlet and the power storage device are electrically connected to each other and a state in which the inlet and the power storage device are electrically disconnected from each other.

3. A vehicle, comprising:
the power supply unit according to claim 1;
the power storage device; and
a floor panel that allows the power storage device to be mounted,
the power storage device being disposed below the floor panel at a location on the vehicle rearwardly of the power supply unit.

4. The power supply unit according to claim 1, wherein the one or more power converters in entirety are disposed below the relay.

5. A vehicle, comprising:
a power supply unit that includes a current path and is capable of receiving external power from an external power supply and supplying the received external power to a power storage device, and receiving power from the power storage device and supplying the received power to a device mounted in the vehicle; and
an auxiliary device, wherein
the power supply unit comprises:
one or more power converters;
a relay that switches the current path;
a housing that accommodates the one or more power converters and the relay therein,
the one or more power converters being heavier in weight than the relay and disposed in the housing below the relay; and
a control device accommodated in the housing and configured to control the relay and the one or more power converters;
the one or more power converters include
a first power converter configured to
receive alternating-current power from an alternating-current power supply external to the vehicle, and
convert the received alternating-current power into first power chargeable to the power storage device,
a second power converter configured to
receive the power from the power storage device, and
convert the received power into second power supplied to an auxiliary device mounted in the vehicle, and
a third power converter configured to convert an output of the first power converter into third power supplied to the auxiliary device mounted in the vehicle,
the control device is lighter in weight than each of the first, second, and third power converters and disposed, in the housing, in entirety above the first, second, and third power converters,
the relay is lighter in weight than each of the first, second, and third power converters and disposed, in the housing, in entirety above the first, second, and third power converters,
the first power converter is heavier in weight than each of the second power converter and the third power converter, and disposed, in the housing, in entirety below the second power converter and the third power converter, and
the second power converter and the third power converter are electrically connected to the auxiliary device.

6. A vehicle, comprising:
a power supply unit that includes a current path and is capable of receiving external power from an external power supply and supplying the received external power to a power storage device, and receiving power from the power storage device and supplying the received power to a device mounted in the vehicle; and
a transaxle, wherein
the power supply unit comprises:
one or more power converters;
a relay that switches the current path;
a housing that accommodates the one or more power converters and the relay therein,
the one or more power converters being heavier in weight than the relay and disposed in the housing below the relay; and
a control device accommodated in the housing and configured to control the relay and the one or more power converters;
the one or more power converters include
a first power converter configured to
receive alternating-current power from an alternating-current power supply external to the vehicle, and
convert the received alternating-current power into first power chargeable to the power storage device,
a second power converter configured to
receive the power from the power storage device, and
convert the received power into second power supplied to an auxiliary device mounted in the vehicle, and
a third power converter configured to convert an output of the first power converter into third power supplied to the auxiliary device mounted in the vehicle, the control device is lighter in weight than each of the first, second, and third power converters and disposed, in the housing, in entirety above the first, second, and third power converters, the relay is lighter in weight than each of the first, second, and third power converters and disposed, in the housing, in entirety above the first, second, and third power converters, the first power converter is heavier in weight than each of the second power converter and the third power converter, and disposed, in the housing, in entirety below the second power converter and the third power converter, and the power supply unit is disposed above the transaxle.

* * * * *